No. 768,398.

Patented August 23, 1904.

UNITED STATES PATENT OFFICE.

MARTIN OVERLACH, OF GREIZ, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

PYRAZOLONE COMPOUND AND PROCESS OF MAKING SAME.

SPECIFICATION forming part of Letters Patent No. 768,398, dated August 23, 1904.

Application filed August 26, 1903. Serial No. 170,819. (Specimens.)

*To all whom it may concern:*

Be it known that I, MARTIN OVERLACH, M. D., a citizen of the Empire of Germany, residing at Greiz, Germany, have invented certain new and useful Improvements in Pyrazolone Compounds and Processes of Making the Same, of which the following is a specification.

This invention relates to the manufacture of a therapeutical compound from 4-dimethylamido-1-phenyl-2:3-dimethyl-5-pyrazolone with butylchloral.

It has been found that butylchloralhydrate, $CH_3.CHCl\text{-}CCl_2\text{-}CH(OH)_2$, behaves differently toward 4-dimethylamido-1-phenyl-2:3-dimethyl-5-pyrazolone than does the chloralhydrate, for it readily yields a beautifully-crystallized compound having the formula $C_{17}H_{24}N_3O_3Cl_3$.

By clinical experiments it has been proved that the new compound is distinguished by valuable therapeutic properties which do not belong to each component by itself. The product is not a soporific, but an anodyne preparation.

The product may be obtained by heating together the two components as such and subsequently recrystallizing the product of reaction from dilute alcohol or benzene or by pouring together while hot solutions of the butylchloralhydrate and 4-dimethylamido-1-phenyl-2:3-dimethyl-5-pyrazolone. When cold, the compound, having the melting-point 85° to 86° centigrade, separates as crystals.

Example I: One hundred and ninety-three to one hundred and ninety-five grams of butylchloralhydrate are melted on the water-bath with two hundred and thirty-one grams of 4-dimethylamido-1-phenyl-2:3-dimethyl-5-pyrazolone. When cold, the whole solidifies to a crystalline mass, which is recrystallized from benzene.

Example II: One hundred and ninety-three to one hundred and ninety-five grams of butylchloralhydrate are dissolved in about one liter of warm water and poured into an equally warm solution of two hundred and thirty-one grams of 4-dimethylamido-1-phenyl-2:3-dimethyl-5-pyrazolone in two liters of water. The liquid turns milky, whereupon crystals soon separate. When cold, the crystalline mass is filtered, washed with water, and dried in a vacuum.

Example III: One hundred and ninety-three to one-hundred and ninety-five grams of butylchloralhydrate and two hundred and thirty-one grams of 4-dimethylamido-1-phenyl-2:3-dimethyl-5-pyrazolone are heated with four hundred grams of benzene until solution is effected and cooled. The whole is then filtered, washed with benzene or ligroine, and dried in a vacuum.

The substance obtained by the above examples is a white powder of yellowish tint having the melting-point of 85° to 86° centigrade. It is soluble with difficulty in cold water, benzene, and ligroine, easily soluble in alcohol and ether.

From clinical reports the new product has remarkable therapeutic properties which do not belong to the two components as such. The product is particularly valuable as anesthetic against the nerves of the brain. No like result can be obtained with mere mechanical mixtures of butylchloralhydrate and 4-dimethylamido-1-phenyl-2:3-dimethyl-5-pyrazolone as with the chemical compound forming the subject of this invention, for the use of the former is accompanied by disagreeable by-effects of the butylchloral, such as the feeling of giddiness.

Having now described my invention, what I claim is—

1. The process herein described of making a chemical compound which consists in heating butylchloralhydrate with 4-dimethylamido-1-phenyl-2:3-dimethyl-5-pyrazolone and purifying the product thus obtained by recrystallization.

2. As a new product, the chemical compound from butylchloralhydrate with 4-dimethylamido-1-phenyl-2:3-dimethyl-5-pyrazolone, being a white powder of yellowish tint having the melting-point 85° to 86° centigrade, soluble with difficulty in cold water, benzene and ligroine, readily soluble in alcohol and ether, and adapted for use as an anesthetic.

In testimony that I claim the foregoing as my invention I have signed my name in presence of two subscribing witnesses.

MARTIN OVERLACH.

Witnesses:
    W. SPIELMEYER,
    PAULA E. MUENCH.